(12) United States Patent
Yu et al.

(10) Patent No.: US 9,608,897 B2
(45) Date of Patent: Mar. 28, 2017

(54) METHOD AND DEVICE FOR TRANSFERRING BOOTSTRAP MESSAGE

(71) Applicant: HUAWEI TECHNOLOGIES CO., LTD., Shenzhen, Guangdong (CN)

(72) Inventors: Yunfu Yu, Beijing (CN); Yisong Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 249 days.

(21) Appl. No.: 14/087,389

(22) Filed: Nov. 22, 2013

(65) Prior Publication Data
US 2014/0082161 A1    Mar. 20, 2014

Related U.S. Application Data

(63) Continuation of application No. PCT/CN2011/074524, filed on May 23, 2011.

(51) Int. Cl.
*G06F 15/173* (2006.01)
*H04L 12/715* (2013.01)
*H04L 12/761* (2013.01)

(52) U.S. Cl.
CPC .............. *H04L 45/04* (2013.01); *H04L 45/16* (2013.01)

(58) Field of Classification Search
CPC ................................ H04L 45/04; H04L 45/16
USPC ......................................... 709/220, 238, 242
See application file for complete search history.

(56) References Cited

U.S. PATENT DOCUMENTS

| 6,636,895 B1 * | 10/2003 | Li ........................... H04L 45/02 370/351 |
| 2007/0214275 A1 | 9/2007 | Mirtorabi et al. ............ 709/230 |
| 2008/0170578 A1 | 7/2008 | Ould-Brahim | |

FOREIGN PATENT DOCUMENTS

| CN | 101026563 | 8/2007 |
| CN | 101567847 | 10/2009 |

OTHER PUBLICATIONS

Bhaskar, Nidhi, Alexander Gall, James Lingard, and Stig Venaas. "Bootstrap Router (BSR) Mechanism for Protocol Independent Multicast (PIM)." Memo for *Network Working Group, The IETF Trust*, pp. 1-42. (Jan. 2008).

(Continued)

*Primary Examiner* — Wing F Chan
*Assistant Examiner* — Joseph Maniwang
(74) *Attorney, Agent, or Firm* — Staas & Halsey LLP (57) ABSTRACT

The present invention discloses a method and a device for transferring a bootstrap message, and relates to the field of communications. The invention is intended to solve a problem in the prior art that a public network tunnel needs to be separately created for a bootstrap message, which consumes a tunnel resource. A technical solution provided in an embodiment of the present invention includes: receiving, by a first provider edge router, a bootstrap message sent by a bootstrap router; sending, by the first provider edge router, to a second provider edge router, a border gateway protocol BGP message including message content of the bootstrap message, so that after receiving the BGP message, the second provider edge router sends, to a customer edge router, the message content included in the BGP message. The embodiments of the present invention are applicable to a next generation multicast virtual private network.

13 Claims, 5 Drawing Sheets

(56) References Cited

OTHER PUBLICATIONS

Aggarwal, Rahul (Ed.), Sarveshwar Bandi, Yiqun Cai, Thomas Morin, Yakov Rekhter, Eric C. Rosen (Ed.), IJsbrand Wijnands, and Seisho Yasukawa. "Multicast in MPLS/BGP IP VPNs draft-ietf-l3vpn-2547bis-mcast-10.txt." Draft memo for *Network Working Group, The IETF Trust*, pp. 1-89. (Jan. 28, 2010).
Extended European Search Report issued Jan. 31, 2014, in corresponding European Patent Application No. 11782982.0.
First Office Action, dated Mar. 4, 2013, in corresponding Chinese Application No. 201180000603.6 (13 pp.).
English Translation of the International Search Report, dated Mar. 15, 2012, in corresponding International Application No. PCT/CN2011/074524 (8 pp.).
International Search Report and Written Opinion, dated Mar. 15, 2012, in corresponding International Application No. PCT/CN2011/074524 (8 pp.)

\* cited by examiner

METHOD AND DEVICE FOR TRANSFERRING BOOTSTRAP MESSAGE

CROSS-REFERENCE TO RELATED APPLICATIONS

This application is a continuation of International Application No. PCT/CN2011/074524, filed on May 23, 2011, which is hereby incorporated by reference in its entirety.

TECHNICAL FIELD

The present invention relates to the field of communications, and in particular, to a method and a device for transferring a bootstrap message.

BACKGROUND

A multicast virtual private network (Multicast Virtual Private Network, MVPN) is a technology supporting a multicast service on the basis of an existing border gateway protocol (Border Gateway Protocol, BGP)/multi-protocol label switching VPN (Multi-Protocol Label Switching VPN, MPLS VPN). In the technology, a private network multicast packet, multicast signaling, and the like are encapsulated, and transferred through a public network tunnel, so as to accomplish transfer of multicast data across public networks. A next generation MVPN (Next Generation MVPN, NG MVPN) technology proposes that a BGP carries multicast signaling on the basis of an existing MVPN, so that multicast signaling is no longer transferred through a public network tunnel.

In an MVPN or an NG MVPN, to enable an ordinary customer edge router (Customer Edge, CE) to acquire rendezvous point (Rendezvous Point, RP) information. The ordinary CE needs to receive and save a bootstrap message that includes the RP information and is sent by a bootstrap router (Bootstrap Router, BSR). In the prior art, when a BSR is configured at the side of a receiver provider edge router (Provider Edge, PE), a process of transferring a bootstrap message includes: sending, by the BSR, a bootstrap message to the receiving PE; sending, by the receiving PE, the bootstrap message to a source PE through a public network tunnel after receiving the bootstrap message sent by the BSR; and receiving, by the source PE, the bootstrap message, and then sending the bootstrap message to an ordinary CE.

During implementation of the process of transferring a bootstrap message, the inventor finds that, because a receiving PE does not send data, a public network tunnel from the receiving PE to a source PE does not exist; and to transfer a bootstrap message, a public network tunnel from the receiving PE to the source PE needs to be separately created for a bootstrap message, which consumes a tunnel resource.

SUMMARY

Embodiments of the present invention provide a method and a device for transferring a bootstrap message, so that transfer of a bootstrap message without depending on a public network tunnel can be implemented.

In one aspect, a method for transferring a bootstrap message is provided and includes: receiving, by a first provider edge router, a bootstrap message sent by a bootstrap router; and sending, by the first provider edge router, to a second provider edge router, a border gateway protocol BGP message including message content of the bootstrap message, so that after receiving the BGP message, the second provider edge router sends, to a customer edge router, the message content included in the BGP message.

In another aspect, a method for transferring a bootstrap message is provided and includes: receiving, by a third provider edge router, a border gateway protocol BGP message that includes message content of a bootstrap message and is sent by a fourth provider edge router, where the bootstrap message is sent by a bootstrap router to the fourth provider edge router; and sending, by the third provider edge router, to a customer edge router, the message content included in the BGP message.

In yet another aspect, a first device for transferring a bootstrap message is provided and includes:

a first message receiving unit, configured to receive a bootstrap message sent by a bootstrap router; and a first message sending unit, configured to send, to a second device for transferring a bootstrap message, a border gateway protocol BGP message including message content of the bootstrap message, so that after receiving the BGP message, the second device for transferring a bootstrap message sends, to a customer edge router, the message content included in the BGP message.

In still another aspect, a third device for transferring a bootstrap message is provided and includes:

a second message receiving unit, configured to receive a border gateway protocol BGP message that includes message content of a bootstrap message and is sent by a fourth device for transferring a bootstrap message, where the bootstrap message is sent by a bootstrap router to the fourth device for transferring a bootstrap message; and a second message sending unit, configured to send, to a customer edge router, the message content included in the BGP message.

In the method and device for transferring a bootstrap message provided in the embodiments of the present invention, after receiving a bootstrap message sent by a bootstrap router, a first provider edge router sends, to a second provider edge router, a border gateway protocol BGP message including message content of the bootstrap message, so that after receiving the BGP message, the second provider edge router sends, to a customer edge router, the message content included in the BGP, so as to implement transfer of the message content of the bootstrap message. With the technical solutions provided in the embodiment of the present invention, a problem in the prior art that a public network tunnel from a receiving PE to a source PE needs to be separately created for a bootstrap message, which consumes a tunnel resource is solved.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. Apparently, the embodiments to be described are merely a part rather than all of the embodiments of the present invention. All other embodiments obtained by a person of ordinary skill in the art based on the embodiments of the present invention without creative efforts shall fall within the protection scope of the present invention.

To solve a problem in the prior art that a public network tunnel needs to be separately created for a bootstrap message, which consumes a tunnel resource, the embodiments of the present invention provide a method and a device for transferring a bootstrap message.

Figure 1:
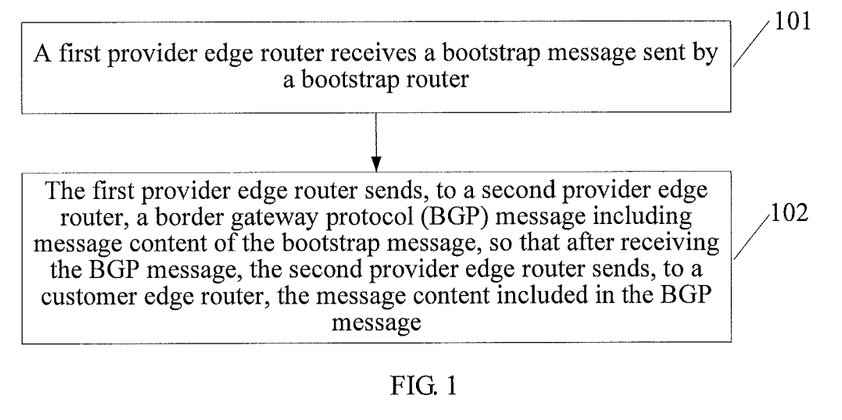
FIG. 1 is a flow chart of a method for transferring a bootstrap message according to a first embodiment of the present invention.

As shown in FIG. 1, the method for transferring a bootstrap message according to a first embodiment of the present invention includes:

Step 101: A first provider edge router receives a bootstrap message sent by a bootstrap router.

In this embodiment, to enable the first provider edge router (Provider Edge, PE) to receive the bootstrap message sent by the BSR through step 101, it may be set that the first PE and the BSR comply with a same multicast transmission protocol, for example, protocol independent multicast (Protocol Independent Multicast, PIM). Because the PIM is a commonly accepted standard of a multicast transmission protocol, and with the PIM, a multicast protocol can be transmitted on an existing IP network, and that a BSR complies with a PIM protocol is taken as an example for specific description in the following. A message transfer process when a BSR complies with another protocol is similar to that when a BSR complies with a PIM protocol, which is no longer described in detail herein.

Step 102: The first provider edge router sends, to a second provider edge router, a border gateway protocol (BGP) message including message content of the bootstrap message, so that after receiving the BGP message, the second provider edge router sends, to a customer edge router, the message content included in the BGP message.

In this embodiment, the first PE may directly send, to the second PE, the BGP message including the message content of the bootstrap message through step 102; or may first determine that the bootstrap message received through step 101 meets a rule, and after determining that the bootstrap message meets the rule, send, to the second PE, the BGP message including the message content of the bootstrap message through step 102, and optionally, may further discard the message after determining that the bootstrap message does not meet the rule; or may send, in another manner, to the second PE, the BGP message including the message content of the bootstrap message through step 102, which is no longer described in detail herein. It is determined that the bootstrap message received through step 101 meets a rule, where the rule may be a reverse path forwarding (Reverse Path Forwarding, RPF) rule, and may also be another rule, which is no longer described in detail herein.

In this embodiment, to enable the first PE to receive the bootstrap message sent by the BSR, it may be set that the first PE complies with PIM, that is, the first PE belongs to a PIM neighbor of the BSR. To enable the second PE to receive the BGP message that includes the message content of the bootstrap message and is sent by the first PE through step 102, it may be set that the first PE and the second PE support a BGP, that is, the second PE belongs to a BGP neighbor of the first PE. The first PE may send, to its all BGP neighbors, the BGP message carrying the bootstrap message through step 102. To distinguish different MVPNs and to enable a bootstrap message not to be exchanged between different MVPNs, the first PE may send, to a BGP neighbor configured with a same MVPN, the BGP message including the message content of the bootstrap message through step 102, which is no longer described in detail herein.

In this embodiment, the BGP message including the message content of the bootstrap message may be periodically sent to the second PE through step 102; or the BGP message including the message content of the bootstrap message may be sent to the second PE when the bootstrap message is updated; or the BGP message including the message content of the bootstrap message may be sent to the second PE in another manner, which is no longer described in detail herein. After receiving the BGP message through step 102, the second PE may parse the BGP message to obtain the message content of the bootstrap message; and then send the message content to the CE, which is no longer described in detail herein.

In this embodiment, the BGP message in step 102 may further include, in addition to the message content of the bootstrap message, a route target (Route Target, RT), so that the second PE receives the BGP message according to the RT. Preferably, the message content of the bootstrap message may include one or more of the following: rendezvous point (Rendezvous Point, RP) information, an RP service main range, and bootstrap router address information, and may also include other information, which is no longer described in detail herein.

In the method for transferring a bootstrap message provided in this embodiment, in step 102, the second PE may be a source PE or a receiving PE; and the first PE may be correspondingly a receiving PE or a source PE. When the first PE is specifically a receiving PE and the second PE is specifically a source PE, after the first PE sends, to the second PE, the BGP message including the message content of the bootstrap message through step 102, the second PE may send, to the CE, the message content included in the BGP message, so that an ordinary CE can obtain RP information in the message content. Because the first PE sends, to the second PE, the BGP message including the message content of the bootstrap message through step 102, the bootstrap message is borne through a BGP without depending on a public network tunnel, thereby solving a problem in the prior art that a public network tunnel from a receiving PE to a source PE needs to be separately created for a bootstrap message, which consumes a tunnel resource. Because the BSR sends the bootstrap message to the second PE through the first PE in a manner of a BGP message, PEs belonging to a same MVPN can acquire message content of a same bootstrap message, so as to implement sharing of a same RP and facilitate control over various types of source discovery on the RP, thereby solving a problem in the prior art that when a public network tunnel from a receiving PE to a source PE does not exist, a BSR and an RP need to be separately configured for two PEs, so that the configuration is complicated and the control over various types of source discovery on the RP is inconvenient. Because the technical solution provided in this embodiment of the present invention is basically consistent with NG MVPN architecture, an Extranet VPN scenario such as Hub&Spoke (Hub&Spoke) can be supported, thereby solving a problem in the prior art that an operation is complicated when a bootstrap message is transferred through a public network tunnel and an Extranet VPN scenario is supported.

Figure 2:
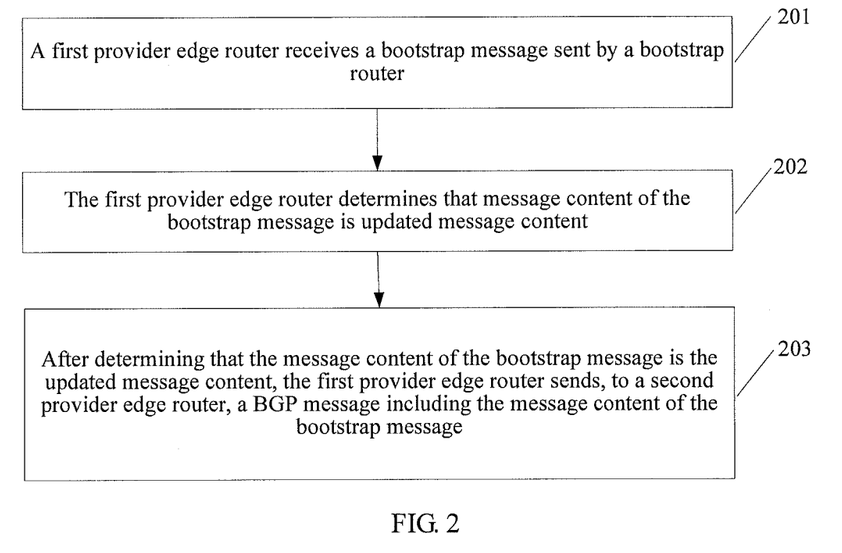
FIG. 2 is a first flow chart of a method for transferring a bootstrap message according to a second embodiment of the present invention.

As shown in FIG. 2, a method for transferring a bootstrap message according to a second embodiment of the present invention includes:

Step 201: A first provider edge router receives a bootstrap message sent by a bootstrap router.

In this embodiment, to enable the first PE to receive the bootstrap message sent by the BSR through step 201, it may be set that the first PE and the BSR comply with a same multicast transmission protocol, such as PIM. Because the PIM is a commonly accepted standard of a multicast transmission protocol, and with the PIM, a multicast protocol can be transmitted on an existing IP network, and that a BSR complies with a PIM protocol is taken as an example for specific description in the following. A message transfer process when a BSR complies with another protocol is similar to that when a BSR complies with a PIM protocol, which is no longer described in detail herein.

Step 202: The first provider edge router determines that message content of the bootstrap message is updated message content.

In this embodiment, the first PE may compare a previously received bootstrap message with a currently received bootstrap message, and determine that the message content of the bootstrap message is updated message content; or, the received bootstrap message includes an identifier identifying that the received bootstrap message is a new bootstrap message, so that the first PE determines, according to the identifier, that the message content of the bootstrap message is updated message content; or may determine, in another manner, that message content of the bootstrap message is updated message content, which is no longer described in detail herein.

Step 203: After determining that the message content of the bootstrap message is the updated message content, the first provider edge router sends, to a second provider edge router, a BGP message including the message content of the bootstrap message.

In this embodiment, the first PE may directly send, to the second PE, the BGP message including the message content of the bootstrap message through step 203; or may first determine that the bootstrap message received through step 201 meets a rule, and after determining that the bootstrap message meets the rule, send, to the second PE, the BGP message including the message content of the bootstrap message through step 203, and optionally, may further discard the message after determining that the bootstrap message does not meet the rule; or may send, in another manner, to the second PE, the BGP message including the message content of the bootstrap message through step 203, which is no longer described in detail herein. When it is determined that the bootstrap message received through step 201 meets a rule, the rule may be an RPF rule, and may also be another rule, which is no longer described in detail herein.

In this embodiment, to enable the first PE to receive the bootstrap message sent by the BSR, it may be set that the first PE comply with PIM, that is, the first PE belongs to a PIM neighbor of the BSR. To enable the second PE to receive the BGP message that includes the message content of the bootstrap message and is sent by the first PE through step 203, it may be set that the first PE and the second PE support a BGP, that is, the second PE belongs to a BGP neighbor of the first PE. The first PE may send, to its all BGP neighbors, the BGP message including the message content of the bootstrap message through step 203. To distinguish different MVPNs to make that a bootstrap message cannot be exchanged between different MVPNs, the first PE may send, to a BGP neighbor configured with a same MVPN, a BGP message including the message content of the bootstrap message through step 203, which is no longer described in detail herein.

In this embodiment, when the bootstrap message in step 203 is an updated bootstrap message, the first PE sends, to the second PE, the BGP message including the message content of the bootstrap message; and optionally, when the bootstrap message is not updated, the first PE does not send, to the second PE, the BGP message including the message content of the bootstrap message, and in this case the second PE may periodically send, to a CE, message content of a bootstrap message stored at a previous time.

Figure 3:
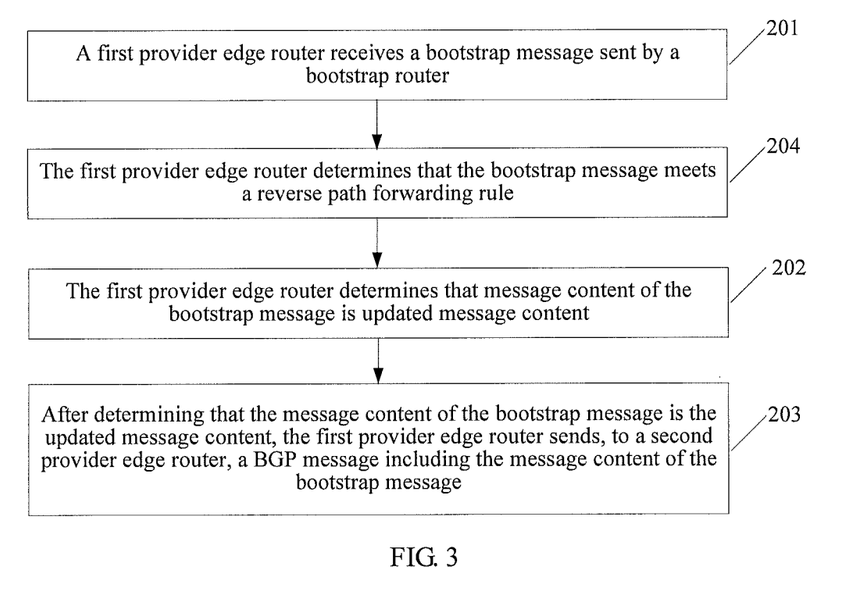
FIG. 3 is a second flow chart of the method for transferring a bootstrap message according to the second embodiment of the present invention.

Further, as shown in FIG. 3, the method for transferring a bootstrap message in this embodiment may further include:

Step 204: The first provider edge router determines that the bootstrap message meets a reverse path forwarding rule.

In this embodiment, to avoid a multicast route loop, transfer of a multicast message in a network may be implemented by means of an RPF check mechanism. After receiving a bootstrap message, the first PE first performs an RPF check on the bootstrap message, that is, determines that the bootstrap message meets an RPF rule through step 204. Through step 204 of determining that the bootstrap message meets an RPF rule, when the RPF rule is met, the first PE may perform an operation such as forwarding on the bootstrap message. Preferably, when the RPF rule is not met, the first PE may discard the bootstrap message, so that the first PE can correctly forward data according to configuration of a multicast route.

In this case, step 202 is that the first provider edge router determines that the message content of the bootstrap message that meets the reverse path forwarding rule is the updated message content.

In this embodiment, the BGP message may further include, in addition to the message content of the bootstrap message, a route target RT, so that the second PE receives the BGP message according to the RT. Preferably, the message content of the bootstrap message may include one or more of the following: RP information, an RP service main range, and bootstrap router address information, and may also include other information, which is no longer described in detail herein.

In the method for transferring a bootstrap message provided in this embodiment, in step 203, the second PE may be a source PE or a receiving PE; and the first PE may be correspondingly a receiving PE or a source PE. When the first PE is specifically a receiving PE and the second PE is specifically a source PE, after the first PE sends, to the second PE, the BGP message including the message content of the bootstrap message, the second PE may send, to the CE, the message content included in the BGP message, so that an ordinary CE can obtain RP information in the message content. Because the first PE sends, to the second PE, the BGP message including the message content of the bootstrap message, the bootstrap message is borne through a BGP without depending on a public network tunnel, thereby solving a problem in the prior art that a public network tunnel from a receiving PE to a source PE needs to be separately created for a bootstrap message, which consumes a tunnel resource. Because the BSR sends the bootstrap message to the second PE through the first PE in a manner of a BGP message, PEs belonging to a same MVPN can acquire message content of a same bootstrap message, so as to implement sharing of a same RP, and facilitate control over various types of source discovery on the RP, thereby solving a problem in the prior art that when a public network tunnel from a receiving PE to a source PE does not exist, a BSR and an RP need to be separately configured for two PEs, so that the configuration is complicated and the control over various types of source discovery on the RP is inconvenient. Because the technical solution provided in this embodiment of the present invention is basically consistent with NG MVPN architecture, an Extranet VPN scenario such as Hub&Spoke (Hub&Spoke) can be supported, thereby solving a problem in the prior art that an operation is complicated when a bootstrap message is transferred through a public network tunnel and an Extranet VPN scenario is supported.

Figure 4:
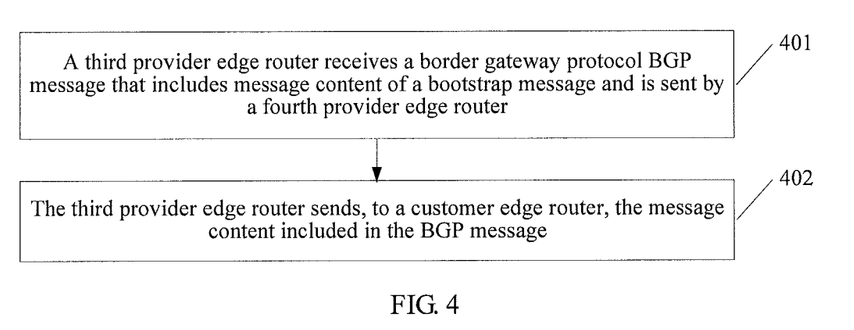
FIG. 4 is a flow chart of a method for transferring a bootstrap message according to a third embodiment of the present invention.

As shown in FIG. 4, a method for transferring a bootstrap message according to a third embodiment of the present invention includes:

Step 401: A third provider edge router receives a border gateway protocol BGP message that includes message content of a bootstrap message and is sent by a fourth provider edge router.

In this embodiment, the BGP message that includes the message content of the bootstrap message and is sent by the fourth PE in step 401 may be sent by a BSR to the fourth PE. Through step 401, the third PE may directly receive the BGP message that includes the message content of the bootstrap message and is sent by the fourth PE; or may receive, according to other content carried in the BGP message, the BGP message that includes the message content of the bootstrap message and is sent by the fourth PE; or may receive, in another manner, the BGP message including the message content of the bootstrap message, which is no longer described in detail herein. For the other content carried in the BGP message, the content may be an RT, and may also be another attribute of a BGP, which is no longer described in detail herein.

In this embodiment, the receiving a BGP message that includes message content of a bootstrap message and is sent by a fourth PE through step 401 may be receiving the BGP message that includes the message content of the bootstrap message and is periodically sent by the fourth PE; or may be receiving the BGP message that includes the message content of the bootstrap message and is sent by the fourth PE when the bootstrap message is updated; or may be receiving the BGP message that includes the message content of the bootstrap message and is sent by the fourth PE in another manner, which is no longer described in detail herein.

In this embodiment, because PIM is a commonly accepted standard of a multicast transmission protocol, and with the PIM, a multicast protocol can be transmitted on an existing IP network, and that a BSR complies with a PIM protocol is taken as an example for specific description in the following. A message transfer process when a BSR complies with another protocol is similar to that when a BSR complies with a PIM protocol, which is no longer described in detail herein. To enable the third PE to receive the BGP message that includes the message content of the bootstrap message and is sent by the fourth PE through step 401, it may be set that the third PE and the fourth PE support a BGP, that is, the third PE belongs to a BGP neighbor of the fourth PE. The third PE may receive the BGP message that includes the message content of the bootstrap message and is sent by the fourth PE through step 401. To distinguish different MVPNs to make that a bootstrap message cannot be exchanged between different MVPNs, the third PE may receive a BGP message that includes the message content of the bootstrap message and is sent by a fourth PE configured with a same MVPN through step 401, which is no longer described in detail herein.

Step 402: The third provider edge router sends, to a customer edge router, the message content included in the BGP message.

In this embodiment, to enable the third PE to send, to the CE, the message content included in the BGP message through step 402, after receiving the BGP message that includes the message content of the bootstrap message and is sent by the fourth PE, the third PE may parse the BGP message to obtain the message content included in the bootstrap message, or may acquire, in another manner, the message content included in the BGP message, which is no longer described in detail herein. The message content included in the BGP message may be periodically sent to the CE through step 402, or the message content included in the BGP message may be sent to the CE in another manner, which is no longer described in detail herein.

In this embodiment, a manner of sending, to the CE, the message content included in the BGP message in step 402 may be to flood, to the CE, the message content included in the BGP message, or another manner may be adopted, which is not limited herein. Preferably, the bootstrap message including the message content may be sent to the CE through step 402. In step 402, to enable the CE to receive the bootstrap message sent by the third PE, it may be set that the CE complies with PIM, that is, the CE belongs to a PIM neighbor of the third PE, so as to implement transfer of the message content of the bootstrap message. Preferably, to make that a bootstrap message cannot be exchanged between different MVPNs, a same MVPN may further be configured for the CE and the third PE.

In this embodiment, the message content of the bootstrap message may include one or more of the following: rendezvous point RP information, an RP service main range, and bootstrap router address information, and may also include other information, which is no longer described in detail herein.

In the method for transferring a bootstrap message provided in this embodiment of the present invention, the third PE may be a source PE or a receiving PE; and the fourth PE may be correspondingly a receiving PE or a source PE. When the fourth PE is specifically a receiving PE and the third PE is specifically a source PE, after the third PE receives the BGP message that includes the message content of the bootstrap message and is sent by the fourth PE, the third PE may send, to the CE, the message content included in the BGP message, so that an ordinary CE can obtain RP information in the message content. Because the third PE receives the BGP message that includes the message content of the bootstrap message and is sent by the fourth PE, the bootstrap message is borne through a BGP without depending on a public network tunnel, thereby solving a problem in the prior art that a public network tunnel from a receiving PE to a source PE needs to be separately created for a bootstrap message, which consumes a tunnel resource. Because the BSR sends the bootstrap message to the third PE through the fourth PE in a manner of a BGP message, PEs belonging to a same MVPN can acquire message content of a same bootstrap message, so as to implement sharing of a same RP, and facilitate control over various types of source discovery on the RP, thereby solving a problem in the prior art that when a public network tunnel from a receiving PE to a source PE does not exist, a BSR and an RP need to be separately configured for each PE, so that the configuration is complicated and the control over various types of source discovery on the RP is inconvenient. Because the technical solution provided in this embodiment of the present invention is basically consistent with NG MVPN architecture, an Extranet VPN scenario such as Hub&Spoke (Hub&Spoke) can be supported, thereby solving a problem in the prior art that an operation is complicated when a bootstrap message is transferred through a public network tunnel and an Extranet VPN scenario is supported.

Figure 5:
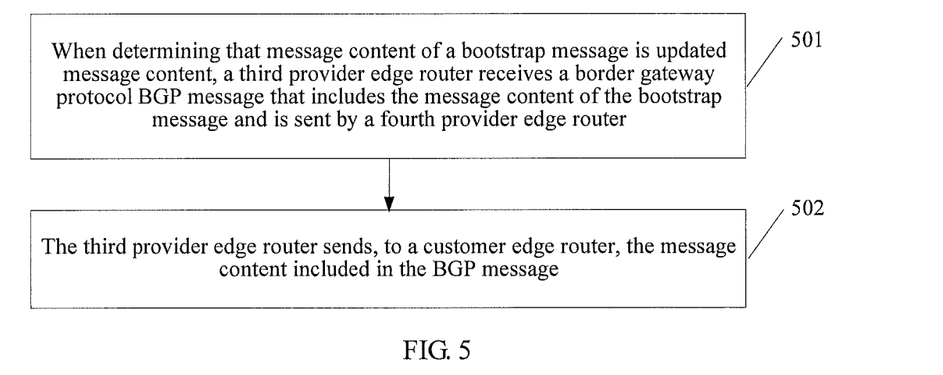
FIG. 5 is a first flow chart of a method for transferring a bootstrap message according to a fourth embodiment of the present invention.

As shown in FIG. 5, a method for transferring a bootstrap message according to a fourth embodiment of the present invention includes:

Step 501: When determining that message content of a bootstrap message is updated message content, a third provider edge router receives a border gateway protocol BGP message that includes the message content of the bootstrap message and is sent by a fourth provider edge router.

In this embodiment, to reduce packet exchange between the third PE and the fourth PE, it may be made through step 501 that the third PE receives, only when it is determined that the message content of the bootstrap message is updated message content, the BGP message that includes the message content of the bootstrap message and is sent by the fourth PE. Optionally, when the bootstrap message is not updated, the fourth PE does not send, to the third PE, the BGP message including the message content of the bootstrap message.

In this embodiment, the BGP message that includes the updated message content and is sent by the fourth PE in step 501 may be sent by a BSR to the fourth PE. Through step 501, the third PE may directly receive the BGP message that includes the updated message content and is sent by the fourth PE; or may receive, according to other content carried in the BGP message, the BGP message that includes the updated message content and is sent by the fourth PE; or may receive, in another manner, the BGP message including the updated message content, which is no longer described in detail herein. For the other content carried in the BGP message, the content may be an RT, and may also be another attribute of a BGP, which is no longer described in detail herein.

In this embodiment, because PIM is a commonly accepted standard of a multicast transmission protocol, and with the PIM, a multicast protocol can be transmitted on an existing IP network, and that a BSR complies with a PIM protocol is taken as an example for specific description in the following. A message transfer process when a BSR complies with another protocol is similar to that when a BSR complies with a PIM protocol, which is no longer described in detail herein. To enable the third PE to receive the BGP message that includes the message content of the bootstrap message and is sent by the fourth PE through step 501, it may be set that the third PE and the fourth PE support a BGP, that is, the third PE belongs to a BGP neighbor of the fourth PE. The third PE may receive the BGP message that includes the message content of the bootstrap message and is sent by the fourth PE through step 501. To distinguish different MVPNs to make that a bootstrap message cannot be exchanged between different MVPNs, the third PE may receive a BGP message that includes the message content of the bootstrap message and is sent by a fourth PE configured with a same MVPN through step 501, which is no longer described in detail herein.

Step 502: The third provider edge router sends, to a customer edge router, the message content included in the BGP message.

In this embodiment, to enable the third PE to send, to the CE, the message content included in the BGP message through step 502, after receiving the BGP message that includes the message content of the bootstrap message and is sent by the fourth PE, the third PE may parse the BGP message to obtain the message content of the bootstrap message, or may acquire, in another manner, the message content included in the BGP message, which is no longer described in detail herein. The message content included in the BGP message may be periodically sent to the CE through step 502, or the message content included in the BGP message may be sent to the CE in another manner, which is no longer described in detail herein.

In this embodiment, a manner of sending, to the CE, the message content included in the BGP message in step 502 may be to flood, to the CE, the message content included in the BGP message, or another manner may be adopted, which is no longer described in detail herein. In step 502, to enable the CE to receive the bootstrap message sent by the third PE, it may be set that the CE complies with PIM, that is, the CE belongs to a PIM neighbor of the third PE, so as to implement transfer of the message content of the bootstrap message.

Figure 6:
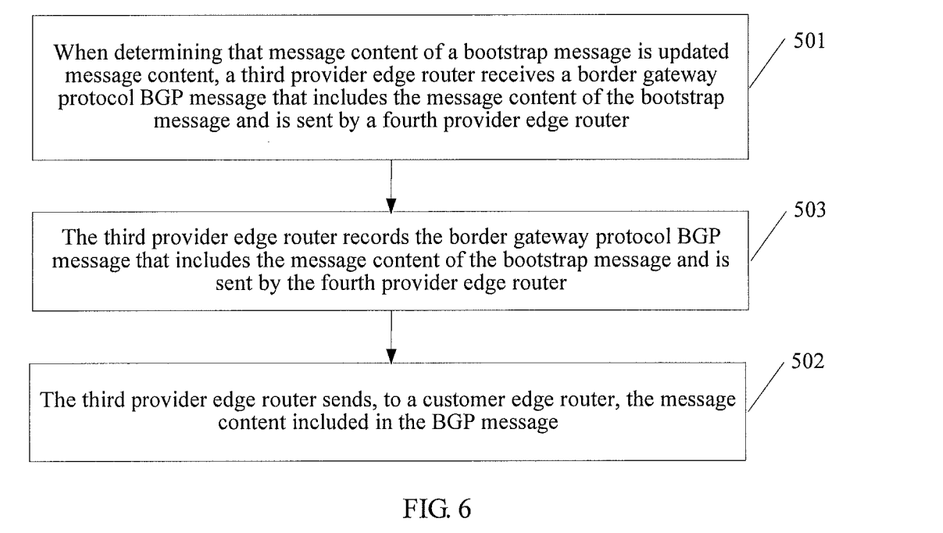
FIG. 6 is a second flow chart of the method for transferring a bootstrap message according to the fourth embodiment of the present invention.

Further, as shown in FIG. 6, the method for transferring a bootstrap message provided in this embodiment may further include:

Step 503: The third provider edge router records the message content of the bootstrap message.

In this embodiment, through step 503, the message content of the bootstrap message may be directly recorded, or the BGP message including the message content of the bootstrap message may be recorded, which is not limited herein.

In this embodiment, to reduce packet exchange between the third PE and the fourth PE, it may be made through step 501 that the third PE receives, only when it is determined that the message content of the bootstrap message is updated message content, the BGP message that includes the updated message content and is sent by the fourth PE. To enable the CE to still receive message content of a previous bootstrap message when the bootstrap message is not updated, the message content of the bootstrap message may be recorded through step 503, so that when the bootstrap message is not updated, the third PE may send, to the CE, information including the message content of the bootstrap message.

In this embodiment, the message content of the bootstrap message may include rendezvous point RP information, an RP service main range, and bootstrap router address information, and may also include other information, which is no longer described in detail herein.

In the method for transferring a bootstrap message provided in this embodiment of the present invention, the third PE may be a source PE or a receiving PE; and the fourth PE may be correspondingly a receiving PE or a source PE. When the fourth PE is specifically a receiving PE and the third PE is specifically a source PE, after the third PE receives the BGP message that includes the message content of the bootstrap message and is sent by the fourth PE, the third PE may send, to the CE, the message content included in the BGP message, so that an ordinary CE can obtain RP information in the bootstrap message. Because the third PE receives the BGP message that includes the message content of the bootstrap message and is sent by the fourth PE, the bootstrap message is borne through a BGP without depending on a public network tunnel, thereby solving a problem in the prior art that a public network tunnel from a receiving PE to a source PE needs to be separately created for a bootstrap message, which consumes a tunnel resource. Because the BSR sends the bootstrap message to the third PE through the fourth PE in a manner of a BGP message, PEs belonging to a same MVPN can acquire message content of a same bootstrap message, so as to implement sharing of a same RP, and facilitate control over various types of source discovery on the RP, thereby solving a problem in the prior art that when a public network tunnel from a receiving PE to a source PE does not exist, a BSR and an RP need to be separately configured for each PE, so that the configuration is complicated and the control over various types of source discovery on the RP is inconvenient. Because the technical solution provided in this embodiment of the present invention is basically consistent with NG MVPN architecture, an Extranet VPN scenario such as Hub&Spoke (Hub&Spoke) can be supported, thereby solving a problem in the prior art that an operation is complicated when a bootstrap message is transferred through a public network tunnel and an Extranet VPN scenario is supported.

Figure 7:
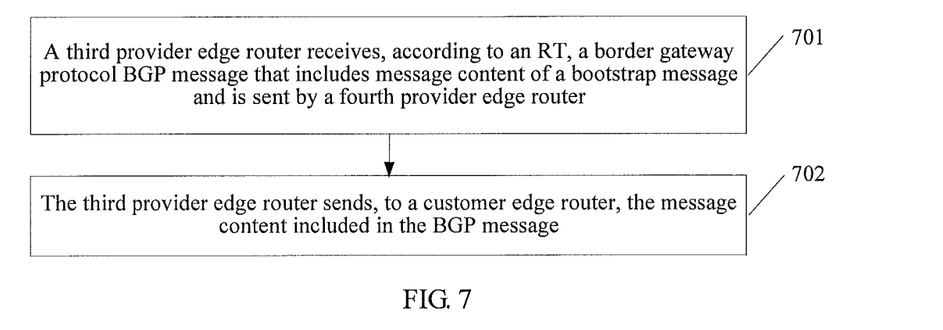
FIG. 7 is a flow chart of a method for transferring a bootstrap message according to a fifth embodiment of the present invention.

As shown in FIG. 7, a method for transferring a bootstrap message according to a fifth embodiment of the present invention includes:

Step 701: A third provider edge router receives, according to an RT, a border gateway protocol BGP message that includes message content of a bootstrap message and is sent by a fourth provider edge router.

In this embodiment, the BGP message sent by the fourth PE may further include, in addition to the message content of the bootstrap message, an RT, so that the third PE may receive, according to the RT, the BGP message that includes the message content of the bootstrap message and is sent by the fourth PE. That is, the third PE matches the RT included in the BGP message with an RT rule. When the matching succeeds, the third PE receives the BGP message including the message content of the bootstrap message. Optionally, when the matching fails, the third PE discards the BGP message.

In this embodiment, the receiving a BGP message that includes message content of a bootstrap message and is sent by a fourth PE through step 701 may be receiving the BGP message that includes the message content of the bootstrap message and is periodically sent by the fourth PE; or may be receiving the BGP message that includes the message content of the bootstrap message and is sent by the fourth PE when the bootstrap message is updated; or may be receiving the BGP message that includes the message content of the bootstrap message and is sent by the fourth PE in another manner, which is no longer described in detail herein.

In this embodiment, because PIM is a commonly accepted standard of a multicast transmission protocol, and with the PIM, a multicast protocol can be transmitted on an existing IP network, and that a BSR complies with a PIM protocol is taken as an example for specific description in the following. A message transfer process when a BSR complies with another protocol is similar to that when a BSR complies with a PIM protocol, which is no longer described in detail herein. To enable the third PE to receive the BGP message that includes the message content of the bootstrap message and is sent by the fourth PE through step 701, it may be set that the third PE and the fourth PE support a BGP, that is, the third PE belongs to a BGP neighbor of the fourth PE. The third PE may receive the BGP message that includes the message content of the bootstrap message and is sent by the fourth PE through step 701. To distinguish different MVPNs to make that a bootstrap message cannot be exchanged between different MVPNs, the third PE may receive a BGP message that includes the message content of the bootstrap message and is sent by a fourth PE configured with a same MVPN through step 701, which is no longer described in detail herein.

Step 702: The third provider edge router sends, to a customer edge router, the message content included in the BGP message, and a specific process is similar to that in step 402 shown in FIG. 4, which is no longer described in detail herein.

In this embodiment, the message content of the bootstrap message may include rendezvous point RP information, an RP service main range, and bootstrap router address information, and may also include other information, which is no longer described in detail herein.

In the method for transferring a bootstrap message provided in this embodiment of the present invention, the third PE may be a source PE or a receiving PE; and the fourth PE may be correspondingly a receiving PE or a source PE. When the fourth PE is specifically a receiving PE and the third PE is specifically a source PE, after the third PE receives the BGP message that includes the message content of the bootstrap message and is sent by the fourth PE, the third PE may send, to the CE, the message content included in the BGP message, so that an ordinary CE can obtain RP information in the bootstrap message. Because the third PE receives the BGP message that includes the message content of the bootstrap message and is sent by the fourth PE, the bootstrap message is borne through a BGP without depending on a public network tunnel, thereby solving a problem in the prior art that a public network tunnel from a receiving PE to a source PE needs to be separately created for a bootstrap message, which consumes a tunnel resource. Because the BSR sends the bootstrap message to the third PE through the fourth PE in a manner of a BGP message, PEs belonging to a same MVPN can acquire message content of a same bootstrap message, so as to implement sharing of a same RP, and facilitate control over various types of source discovery on the RP, thereby solving a problem in the prior art that when a public network tunnel from a receiving PE to a source PE does not exist, a BSR and an RP need to be separately configured for each PE, so that the configuration is complicated and the control over various types of source discovery on the RP is inconvenient. Because the technical solution provided in this embodiment of the present invention is basically consistent with NG MVPN architecture, an Extranet VPN scenario such as Hub&Spoke (Hub&Spoke) can be supported, thereby solving a problem in the prior art that an operation is complicated when a bootstrap message is transferred through a public network tunnel and an Extranet VPN scenario is supported.

Figure 8:
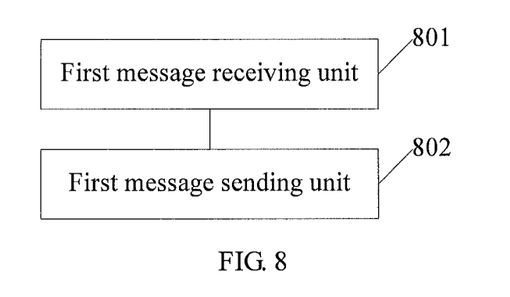
FIG. 8 is a first schematic structural diagram of a first device for transferring a bootstrap message according to a sixth embodiment of the present invention.

As shown in FIG. 8, a first device for transferring a bootstrap message according to a sixth embodiment of the present invention includes:

A first message receiving unit 801 is configured to receive a bootstrap message sent by a bootstrap router.

In this embodiment, to enable the first device for transferring a bootstrap message to receive, through the first message receiving unit 801, the bootstrap message sent by the BSR, it may be set that the first device for transferring a bootstrap message and the BSR comply with a same multicast transmission protocol, such as PIM. Because the PIM is a commonly accepted standard of a multicast transmission protocol, and with the PIM, a multicast protocol can be transmitted on an existing IP network, and that a BSR complies with a PIM protocol is taken as an example for specific description in the following. A message transfer process when a BSR complies with another protocol is similar to that when a BSR complies with a PIM protocol, which is no longer described in detail herein.

A first message sending unit 802 is configured to send, to a second device for transferring a bootstrap message, a border gateway protocol BGP message including message content of the bootstrap message, so that after receiving the BGP message, the second device for transferring a bootstrap message sends, to a customer edge router, the message content included in the BGP message.

In this embodiment, the first device for transferring a bootstrap message may directly send, through the first message sending unit 802, to the second device for transferring a bootstrap message, the BGP message including the message content of the bootstrap message; or may first determine that the bootstrap message received by the first message receiving unit 801 meets a rule, and after determining that the bootstrap message meets the rule, send, through the first message sending unit 802, to the second device for transferring a bootstrap message, the BGP message including the message content of the bootstrap message, and optionally, may further discard the message after determining that the bootstrap message does not meet the rule; or may send, through the first message sending unit 802, in another manner, to the second device for transferring a bootstrap message, the BGP message including the message content of the bootstrap message, which is no longer described in detail herein. When it is determined that the bootstrap message received by the first message receiving unit 801 meets a rule, the rule may be an RPF rule, and may also be another rule, which is no longer described in detail herein.

Figure 9:
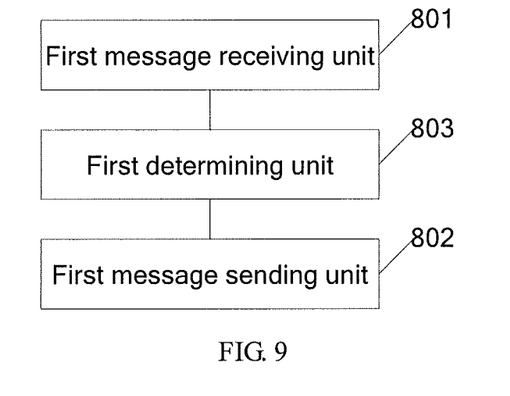
FIG. 9 is a second schematic structural diagram of the first device for transferring a bootstrap message according to the sixth embodiment of the present invention.

Further, as shown in FIG. 9, the device for transferring a bootstrap message provided in this embodiment may further include:

A first determining unit 803 is configured to determine that the message content of the bootstrap message is updated message content.

In this embodiment, the first device for transferring a bootstrap message may compare a previously received bootstrap message with a currently received bootstrap message, and determine that the message content of the bootstrap message is updated message content; or, the received bootstrap message includes an identifier identifying that the received bootstrap message is a new bootstrap message, so that the first device for transferring a bootstrap message determines, according to the identifier, that the message content of the bootstrap message is updated message content; or may determine, in another manner, that the message content of the bootstrap message is updated message content, which is no longer described in detail herein.

In this case, the first message sending unit 802 is configured to send, after it is determined that the message content of the bootstrap message is the updated message content, to the second device for transferring a bootstrap message, the BGP message including the message content of the bootstrap message.

Figure 10:
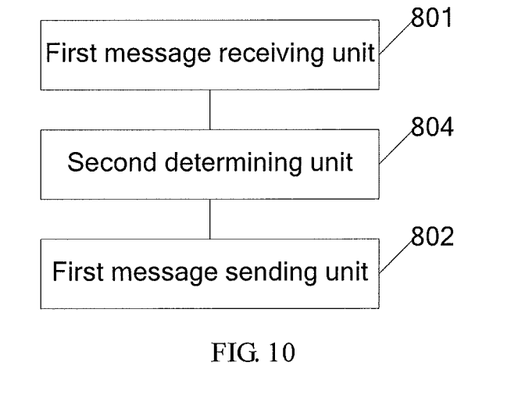
FIG. 10 is a third schematic structural diagram of the first device for transferring a bootstrap message according to the sixth embodiment of the present invention.

Further, as shown in FIG. 10, the device for transferring a bootstrap message in this embodiment may further include:

A second determining unit 804 is configured to determine that the bootstrap message meets a reverse path forwarding rule.

In this embodiment, to avoid a multicast route loop, transfer of a multicast message in a network may be implemented by means of an RPF check mechanism. After receiving a bootstrap message, the first device for transferring a bootstrap message first performs an RPF check on the bootstrap message, that is, determines, through the second determining unit 804, that the bootstrap message meets an RPF rule. After it is determined, through the second determining unit 804, that that the bootstrap message meets an RPF rule, the first device for transferring a bootstrap message may perform an operation such as forwarding on the bootstrap message. Preferably, when it is determined that the bootstrap message does not meet the rule, the first device for transferring a bootstrap message may discard the bootstrap message, so that the first device for transferring a bootstrap message can correctly forward data according to configuration of a multicast route.

In this case, the first message sending unit 802 is configured to determine that the message content of the bootstrap message that meets the reverse path forwarding rule is the updated message content.

In this embodiment, to enable the first device for transferring a bootstrap message to receive the bootstrap message sent by the BSR, it may be set that the first device for transferring a bootstrap message complies with PIM, that is, the first device for transferring a bootstrap message belongs to a PIM neighbor of the BSR. To enable the second device for transferring a bootstrap message to receive the BGP message that carries the bootstrap message and is sent by the first device for transferring a bootstrap message, it may be set that the first device for transferring a bootstrap message and the second device for transferring a bootstrap message support a BGP, that is, the second device for transferring a bootstrap message belongs to a BGP neighbor of the first device for transferring a bootstrap message. The first device for transferring a bootstrap message may send, to its all BGP neighbors, the BGP message carrying the bootstrap message. To distinguish different MVPNs to make that a bootstrap message cannot be exchanged between different MVPNs, the first device for transferring a bootstrap message may send, to a BGP neighbor configured with a same MVPN, the BGP message including the message content of the bootstrap message, which is no longer described in detail herein.

In this embodiment, the first message sending unit 802 may periodically send, to the second device for transferring a bootstrap message, the BGP message including the message content of the bootstrap message; or may send, to the second device for transferring a bootstrap message, the BGP message including the message content of the bootstrap message when the bootstrap message is updated; or may send, in another manner, to the second device for transferring a bootstrap message, the BGP message including the message content of the bootstrap message, which is no longer described in detail herein. After receiving the BGP message, the second device for transferring a bootstrap message may perform processing such as parsing on the BGP message to obtain the message content of the bootstrap message; and then send the message content to the CE, which is no longer described in detail herein.

In this embodiment, the BGP message may further include, in addition to the message content of the bootstrap message, an RT, so that the second device for transferring a bootstrap message receives the BGP message according to the RT. Preferably, the message content of the bootstrap message may include one or more of the following: RP information, an RP service main range, and bootstrap router address information, and may also include other information, which is no longer described in detail herein.

In this embodiment, the first device for transferring a bootstrap message may be a PE. Further, the second device for transferring a bootstrap message may be another PE. The first message receiving unit may be an interface for receiving a first message, where the first message includes a bootstrap message, and the like. The first message sending unit may be an interface for sending a second message, where the second message includes a BGP message, and the like.

In the device for transferring a bootstrap message provided in this embodiment of the present invention, the second device for transferring a bootstrap message configured for message transmission may be a source PE or a receiving PE; and the first device for transferring a bootstrap message may be correspondingly a receiving PE or a source PE. When the first device for transferring a bootstrap message is specifically a receiving PE and the second device for transferring a bootstrap message is specifically a source PE, after the first device for transferring a bootstrap message sends, to the second device for transferring a bootstrap message, the BGP message including the message content of the bootstrap message, the second device for transferring a bootstrap message may send, to the CE, the message content included in the BGP message, so that an ordinary CE can obtain RP information in the message content. Because the first device for transferring a bootstrap message sends, to the second device for transferring a bootstrap message, the BGP message including the message content of the bootstrap message, the bootstrap message is borne through a BGP without depending on a public network tunnel, thereby solving a problem in the prior art that a public network tunnel from a receiving PE to a source PE needs to be separately created for a bootstrap message, which consumes a tunnel resource. Because the BSR sends the bootstrap message to the second device for transferring a bootstrap message through the first device for transferring a bootstrap message in a manner of a BGP message, devices for transferring a bootstrap message belonging to a same MVPN can acquire message content of a same bootstrap message, so as to implement sharing of a same RP, and facilitate control over various types of source discovery on the RP, thereby solving a problem in the prior art that when a public network tunnel from a receiving PE to a source PE does not exist, a BSR and an RP need to be separately configured for two PEs, so that the configuration is complicated and the control over various types of source discovery on the RP is inconvenient. Because the technical solution provided in this embodiment of the present invention is basically consistent with NG MVPN architecture, an Extranet VPN scenario of Hub&Spoke (Hub&Spoke) can be supported, thereby solving a problem in the prior art that an operation is complicated when a bootstrap message is transferred through a public network tunnel and an Extranet VPN scenario is supported.

Figure 11:
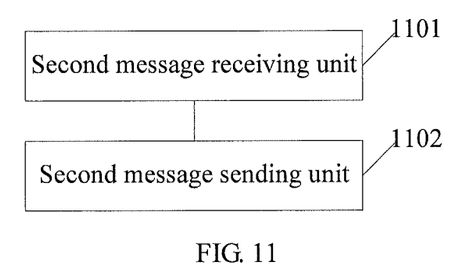
FIG. 11 is a first schematic structural diagram of a third device for transferring a bootstrap message according to a seventh embodiment of the present invention.

As shown in FIG. 11, a third device for transferring a bootstrap message according to a seventh embodiment of the present invention includes:

A second message receiving unit 1101 is configured to receive a border gateway protocol BGP message that includes message content of a bootstrap message and is sent by a fourth device for transferring a bootstrap message, where the bootstrap message is sent by a bootstrap router to the fourth device for transferring a bootstrap message.

In this embodiment, the BGP message in the second message receiving unit 1101 that includes the message content of the bootstrap message and is sent by the fourth device for transferring a bootstrap message may be sent by the BSR to the fourth device for transferring a bootstrap message. Through the second message receiving unit 1101, the third device for transferring a bootstrap message may directly receive the BGP message that includes the message content of the bootstrap message and is sent by the fourth device for transferring a bootstrap message; or may receive, according to other content carried in the BGP message, the BGP message that includes the message content of the bootstrap message and is sent by the fourth device for transferring a bootstrap message; or may receive, in another manner, the BGP message including the message content of the bootstrap message, which is no longer described in detail herein. For the other content carried in the BGP message, the content may be an RT, and may also be another attribute of a BGP, which is no longer described in detail herein.

In this embodiment, receiving, through the second message receiving unit 1101, the BGP message that includes the message content of the bootstrap message and is sent by the fourth device for transferring a bootstrap message may be receiving the BGP message that includes the message content of the bootstrap message and is periodically sent by the fourth device for transferring a bootstrap message; may be receiving the BGP message that includes the message content of the bootstrap message and is sent by the fourth device for transferring a bootstrap message when the bootstrap message is updated; or may be receiving the BGP message that includes the message content of the bootstrap message and is sent by the fourth device for transferring a bootstrap message in another manner, which is no longer described in detail herein.

In this embodiment, because PIM is a commonly accepted standard of a multicast transmission protocol, and with the PIM, a multicast protocol can be transmitted on an existing IP network, and that a BSR complies with a PIM protocol is taken as an example for specific description in the following. A message transfer process when a BSR complies with another protocol is similar to that when a BSR complies with a PIM protocol, which is no longer described in detail herein. To enable the third device for transferring a bootstrap message to receive, through the second message receiving unit 1101, the BGP message that includes the message content of the bootstrap message and is sent by the fourth device for transferring a bootstrap message, it may be set that the third device for transferring a bootstrap message and the fourth device for transferring a bootstrap message support a BGP, that is, the third device for transferring a bootstrap message belongs to a BGP neighbor of the fourth device for transferring a bootstrap message. The third device for transferring a bootstrap message may receive, through the second message receiving unit 1101, the BGP message that includes the message content of the bootstrap message and is sent by the fourth device for transferring a bootstrap message. To distinguish different MVPNs to make that a bootstrap message cannot be exchanged between different MVPNs, the third device for transferring a bootstrap message may receive, through the second message receiving unit 1101, the BGP message that includes the message content of the bootstrap message and is sent by a fourth device for transferring a bootstrap message configured with a same MVPN, which is no longer described in detail herein.

A second message sending unit 1102 is configured to send, to a customer edge router, the message content included in the BGP message.

In this embodiment, to enable the third device for transferring a bootstrap message to send, through the second message sending unit 1102, to the CE, the message content included in the BGP message, after receiving the BGP message that includes the message content of the bootstrap message and is sent by the fourth device for transferring a bootstrap message, the third device for transferring a bootstrap message may parse the BGP message to obtain the message content of the bootstrap message, or may acquire, in another manner, the message content included in the BGP message, which is no longer described in detail herein. The message content included in the BGP message may be periodically sent to the CE through the second message sending unit 1102, or the message content included in the BGP message may be sent to the CE in another manner, which is no longer described in detail herein.

Further, the second message receiving unit 1101 in this embodiment may include:

A receiving subunit is configured to receive, when it is determined that the message content of the bootstrap message is updated message content, the border gateway protocol BGP message that includes the message content of the bootstrap message and is sent by the fourth device for transferring a bootstrap message.

In this embodiment, to reduce packet exchange between the third device for transferring a bootstrap message and the fourth device for transferring a bootstrap message, it may be made through the receiving subunit that the third device for transferring a bootstrap message receives, only when it is determined that the message content of the bootstrap message is updated message content, the BGP message that includes the message content of the bootstrap message and is sent by the fourth device for transferring a bootstrap message; and when the bootstrap message is not updated, the fourth device for transferring a bootstrap message does not send the bootstrap message to the third device for transferring a bootstrap message.

Figure 12:
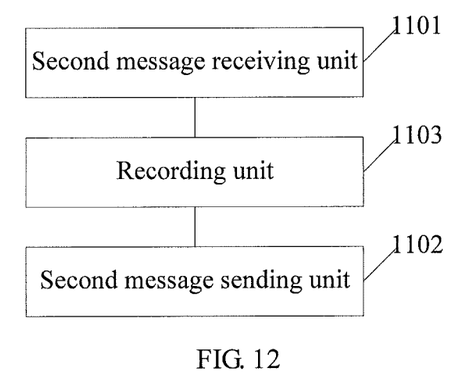
FIG. 12 is a second schematic structural diagram of the third device for transferring a bootstrap message according to the seventh embodiment of the present invention.

Further, as shown in FIG. 12, the device for transferring a bootstrap message in this embodiment may further include:

A recording unit 1103 is configured to record the message content of the bootstrap message.

In this embodiment, the message content of the bootstrap message may be directly recorded through the recording unit 1103, or the BGP message that includes the message content of the bootstrap message may be recorded, which is not limited herein.

In this embodiment, to reduce packet exchange between the third device for transferring a bootstrap message and the fourth device for transferring a bootstrap message, it may be made that the third device for transferring a bootstrap message receives, only when it is determined the message content of the bootstrap message is updated message content, the BGP message that includes the updated message content and is sent by the fourth device for transferring a bootstrap message. To enable the CE to still receive message content of a previous bootstrap message when the bootstrap message is not updated, the message content of the bootstrap message may be recorded through the recording unit 1103, so that when the bootstrap message is not updated, the third device for transferring a bootstrap message may send, to the CE, information including the message content of the bootstrap message.

In this embodiment, to enable the third device for transferring a bootstrap message to send, through the second message sending unit 1102, to the CE, the message content included in the BGP message, after receiving the BGP message that includes the message content of the bootstrap message and is sent by the fourth device for transferring a bootstrap message, the third device for transferring a bootstrap message may parse the BGP message to obtain the message content of the bootstrap message, or may acquire, in another manner, the message content included in the BGP message, which is no longer described in detail herein. The message content included in the BGP message may be periodically sent to the CE through the second message sending unit 1102, or the message content included in the BGP message may be sent to the CE in another manner, which is no longer described in detail herein.

In this embodiment, the BGP message sent by the fourth device for transferring a bootstrap message may further include, in addition to the message content of the bootstrap message, an RT, so that the third device for transferring a bootstrap message may receive, according to the RT, the BGP message that includes the message content of the bootstrap message and is sent by the fourth device for transferring a bootstrap message. That is, the third device for transferring a bootstrap message matches the RT included in the BGP message with an RT rule. When the matching succeeds, the third device for transferring a bootstrap message receives the BGP message including the message content of the bootstrap message. Optionally, when the matching fails, the third device for transferring a bootstrap message discards the BGP message. In this case, the second message receiving unit 1101 is configured to receive, according to the RT, the border gateway protocol BGP message that includes the message content of the bootstrap message and is sent by the fourth device for transferring a bootstrap message.

In this embodiment, a manner of sending by the second message sending unit 1102, to the CE, the message content of the bootstrap message included in the BGP message may be to flood, to the CE, the message content included in the BGP message, or another manner may be adopted, which is not limited herein. Preferably, the bootstrap message including the message content may be sent to the CE through step 402. In the second message sending unit 1102, to enable the CE to receive the bootstrap message that carries the message content and is sent by the third device for transferring a bootstrap message, it may be set that the CE complies with PIM, that is, the CE belongs to a PIM neighbor of the third device for transferring a bootstrap message, so as to implement transfer of the message content of the bootstrap message. Preferably, to make that a bootstrap message cannot be exchanged between different MVPNs, a same MVPN may further be configured for the CE and the third device for transferring a bootstrap message.

In this embodiment, the message content of the bootstrap message may include one or more of the following: rendezvous point RP information, an RP service main range, and bootstrap router address information, and may also include other information, which is no longer described in detail herein.

In this embodiment, the third device for transferring a bootstrap message may be a PE. Further, the fourth device for transferring a bootstrap message may be another PE. The second message receiving unit may be an interface for receiving a third message, where the third message includes a BGP message, and the like. The second message sending unit may be an interface for sending a fourth message, where the fourth message includes a bootstrap message, and the like.

In the device for transferring a bootstrap message provided in this embodiment of the present invention, the third device for transferring a bootstrap message configured for message transmission may be a source PE or a receiving PE; and the fourth device for transferring a bootstrap message may be correspondingly a receiving PE or a source PE. When the fourth device for transferring a bootstrap message is specifically a receiving PE and the third device for transferring a bootstrap message is specifically a source PE, after the third device for transferring a bootstrap message receives the BGP message that includes the message content of the bootstrap message and is sent by the fourth device for transferring a bootstrap message, the third device for transferring a bootstrap message may send, to the CE, the message content included in the BGP message, so that an ordinary CE can obtain RP information in the bootstrap message. Because the third device for transferring a bootstrap message receives the BGP message that includes the message content of the bootstrap message and is sent by the fourth device for transferring a bootstrap message, the bootstrap message is borne through a BGP without depending on a public network tunnel, thereby solving a problem in the prior art that a public network tunnel from a receiving PE to a source PE needs to be separately created for a bootstrap message, which consumes a tunnel resource. Because the BSR sends the bootstrap message to the fourth device for transferring a bootstrap message through the third device for transferring a bootstrap message in a manner of a BGP message, devices for transferring a bootstrap message belonging to a same MVPN can acquire message content of a same bootstrap message, so as to implement sharing of a same RP, and facilitate control over various types of source discovery on the RP, thereby solving a problem in the prior art that when a public network tunnel from a receiving PE to a source PE does not exist, a BSR and an RP need to be separately configured for each PE, so that the configuration is complicated and the control over various types of source discovery on the RP is inconvenient. Because the technical solution provided in this embodiment of the present invention is basically consistent with NG MVPN architecture, an Extranet VPN scenario of Hub&Spoke (Hub&Spoke) can be supported, thereby solving a problem in the prior art that an operation is complicated when a bootstrap message is transferred through a public network tunnel and an Extranet VPN scenario is supported.

The method and device for transferring a bootstrap message provided in the embodiments of the present invention are applicable to a multicast virtual private network and a next generation multicast virtual private network.

The methods and algorithm steps described in combination with the embodiments disclosed in this specification may be directly implemented by hardware, software executed by a processor, or a combination of the two. Software modules may be located in a random access memory (RAM), a memory, a read-only memory (ROM), an electrically programmable ROM, an electrically erasable programmable ROM, a register, a hard disk, a removable magnetic disk, a CD-ROM, or a storage medium in any other form known in the technical field.

The foregoing descriptions are merely specific embodiments of the present invention, but are not intended to limit the protection scope of the present invention. Any variation or replacement readily figured out by a person skilled in the art within the technical scope disclosed in the present invention shall all fall within the protection scope of the present invention. Therefore, the protection scope of the present invention shall be subject to the protection scope of the claims.

What is claimed is:

1. A method for transferring a bootstrap message, comprising:
   receiving, by a first provider edge router, a bootstrap message sent by a bootstrap router; and
   sending, by the first provider edge router, to a second provider edge router, a border gateway protocol BGP message, wherein the BGP message comprises message content of the bootstrap message, wherein the message content of the bootstrap message comprises two or more of the following: rendezvous point RP address information, an RP service main range, and bootstrap router address information.

2. The method for transferring a bootstrap message according to claim 1, wherein after the receiving, by a first provider edge router, a bootstrap message, the method further comprises:
   determining, by the first provider edge router, whether the message content of the bootstrap message is updated message content; and
   the sending, by the first provider edge router, to a second provider edge router, a border gateway protocol BGP message comprises: in response to determining that the message content of the bootstrap message is the updated message content, sending, by the first provider edge router, the BGP message to the second provider edge router.

3. The method according to claim 1, wherein the BGP message further comprises a route target RT, so that the second provider edge router receives the BGP message according to the RT.

4. A method for transferring a bootstrap message, comprising:
   receiving, by a second provider edge router, a border gateway protocol BGP message that comprises message content of a bootstrap message and is sent by a first provider edge router, wherein the bootstrap message is sent to the first provider edge router by a bootstrap router; and
   sending, by the second provider edge router, to a customer edge router, the message content comprised in the BGP message; wherein the message content of the bootstrap message comprises two or more of: rendezvous point RP address information, an RP service main range, and bootstrap router address information.

5. The method for transferring a bootstrap message according to claim 4, wherein the receiving, by a second provider edge router, a border gateway protocol BGP message that comprises message content of a bootstrap message and is sent by a first provider edge router comprises:

determining, by the second provider edge router, whether the message content of the bootstrap message is updated message content;

in response to determining the message content of the bootstrap message is updated message content, receiving, by the second provider edge router, the border gateway protocol BGP message that comprises the message content of the bootstrap message and is sent by the first provider edge router.

6. The method for transferring a bootstrap message according to claim 5, further comprising:

recording, by the second provider edge router, the message content of the bootstrap message.

7. The method for transferring a bootstrap message according to claim 4, wherein the BGP message further comprises a route target RT; and the receiving, by a second provider edge router, a border gateway protocol BGP message that comprises message content of a bootstrap message and is sent by a first provider edge router is: receiving, by the second provider edge router, according to the RT, the border gateway protocol BGP message that comprises the message content of the bootstrap message and is sent by the first provider edge router.

8. A first device for transferring a bootstrap message, comprising:

a memory storing instructions; and a processor coupled to the memory to execute the instructions to:

receive a bootstrap message sent by a bootstrap router; and send, to a second device for transferring a bootstrap message, a border gateway protocol BGP message, wherein the BGP message comprises message content of the bootstrap message, wherein the message content of the bootstrap message comprises two or more of: rendezvous point RP address information, an RP service main range, and bootstrap router address information.

9. The first device for transferring a bootstrap message according to claim 8, the processor is further configured to:

determine whether the message content of the bootstrap message is updated message content, wherein send, after it is determined that the message content of the bootstrap message is the updated message content, to the second device for transferring a bootstrap message, the BGP message comprising the message content of the bootstrap message.

10. A second device for transferring a bootstrap message, comprising:

a memory storing instructions; and a processor coupled to the memory to execute the instructions to:

receive a border gateway protocol BGP message that comprises message content of a bootstrap message and is sent by a first device for transferring a bootstrap message, wherein the bootstrap message is sent by a bootstrap router to the first device for transferring a bootstrap message; and send, to a customer edge router, the message content comprised in the BGP message; wherein the message content of the bootstrap message comprises two or more of: rendezvous point RP address information, an RP service main range, and bootstrap router address information.

11. The second device for transferring a bootstrap message according to claim 10, wherein the processor is configured to:

determine whether the message content of the bootstrap message is updated message content;

receive, in response to determining that the message content of the bootstrap message is updated message content, the border gateway protocol BGP message that comprises the message content of the bootstrap message and is sent by the first device for transferring a bootstrap message.

12. The second device for transferring a bootstrap message according to claim 11, the processor is further configured to:

record the message content of the bootstrap message.

13. The second device for transferring a bootstrap message according to claim 10, wherein the BGP message further comprises a route target RT; and the processor is configured to receive, according to the RT, the border gateway protocol BGP message that comprises the message content of the bootstrap message and is sent by the first device for transferring a bootstrap message.

* * * * *